3,456,001
PROCESS FOR PURIFYING BENZENE
CARBOXYLIC ACIDS
George P. Olsen, Highland, Ind., assignor to Standard Oil Company, Chicago, Ill., a corporation of Indiana
No Drawing. Continuation-in-part of application Ser. No. 544,366, Apr. 22, 1966. This application May 31, 1967, Ser. No. 642,358
Int. Cl. C07c 51/42
U.S. Cl. 260—525    8 Claims

ABSTRACT OF THE DISCLOSURE

A process for the purification of benzene carboxylic acids by contacting said acids with a supported noble metal catalyst in acidic solution in the absence of hydrogen.

---

This is a continuation-in-part of my copending application Ser. No. 544,366, filed Apr. 22, 1966, and of application Ser. No. 269,147, filed Mar. 29, 1963, now abandoned, of which Ser. No. 544,366 is a continuation-in-part application.

Benzene carboxylic acids are becoming of increasing commercial importance, being used in esterified form for plasticizers and raw materials for resin manufacture, and in particular being used directly or as an initial raw material in the manufacture of high molecular weight polymers from which fibers and films are made. As the technology develops, the purity requirements for such acids or their esters have become more stringent.

Of particular importance commercially is terephthalic acid, from which is made high molecular weight polyesters such as Dacron, Mylar, Kodel, Vycron, etc. Because of the adverse effect of relatively small amounts of impurities generally found in commercially available trephthalic acid, it has not been practical to make such polyester directly from terephthalic acid, but the terephthalic acid is instead esterified, generally wtih methanol, to make dimethyl terephthalate, which is then transesterified with an appropriate glycol and polycondensed to form the polyester. The conversion to dimethyl terephthalate has been used as a means of eliminating the impurities from terephthalic acid, but it is an expensive process and not inherently necessary inasmuch as acceptable polyesters suitable for textile manufacture may be made directly from terephthalic acid if its purity is sufficiently high.

It has now been discovered that benzene carboxylic acids may be purified by forming an acidic solution of the crude acid, contacting the solution in the absence of hydrogen with a supported noble metal catalyst, and thereafter recovering from the solution the carboxylic acid having a reduced content of impurities relative to the crude acid. The process is of particular value for purifying crude terephthalic acid by contacting a hot aqueous solution of terephthalic acid with a noble metal such as palladium disposed on a high surface area support, cooling the solution to crystallize therefrom the terephthalic acid, and then recovering the purified terephthalic acid by conventional liquid-solids separation means.

The crude acid to be purified generally has less than about 5% impurities in it when made by processes now well known, such as oxidation of an appropriately substituted alkyl benzene (or a partially oxidized derivative thereof) by oxidation with nitric acid, or by oxygen using a heavy metal catalyst preferably in the conjoint presence of bromine, or by the isomerization or disproportionation of various inorganic salts of another benzene caboxylic acid. The avoidance of small amounts of by-products or partially oxidized products is difficult when oxidizing the alkyl benzenes to the corresponding phthalic acids. These undesirable contaminants are particularly difficult to remove from terephthalic acid because it cannot be distilled without subliming at temperatures below its thermal decomposition point and because it is relatively insoluble in most solvents. Also, when recrystallized from a solvent, terephthalic acid apparently has a tendency to bring down with its crystals a significant fraction of the impurities which were in the crude acid. The character of the impurities generally found in terephthalic acid has not been definitely delineated. One, however, is known to be 4-carboxybenzaldehyde. Other impurities, not identified but perhaps of a benzyl, fluoronone or extensively olefinically conjugated type, may also be present. In view of the relative ease of quantitatively determining 4-carboxybenzaldehyde, the amount of that compound in terephthalic acid has been used extensively as a criterion of effectiveness in purification procedures.

The purification process is conducted by forming a solution of the crude acid in a solvent which is inert to the acid. Water is preferred, because it is inert in respect to the acid and presents a minimum of corrosion problems, as well as being about as effective a solvent for terephthalic acid as is generally available. However, terephthalic acid is relatively insoluble in water, being only about 5 grams per 100 grams of water at 225° C., and only about 1 gram per 100 grams of water at 185° C.; additional solubility data are given in U.S. Patent No. 2,905,708. Other solvents which may be used are the lower aliphatic acids, such as acetic acid, dimethyl formamide and ketones, such as acetone, methylethyl ketone, etc. Alcohols are undesirable solvents because they are not inert, and tend to esterify the acid. The contacting of the solution with the noble metal catalyst is done at an elevated temperature, in the range of 100–300° C., advantageously with terephthalic acid at 225–275° C., and preferably at about 240–260° C., in order to dissolve as much acid in the solvent as is practical. The pressure used in the process need only be sufficient to maintain a liquid system, although excess pressure is not harmful from a technological standpoint.

The catalyst used in the purification process comprises a noble metal, in the range of about 0.01 to about 10 weight percent, disposed on a support. The term "noble metal" designates the six members of the platinum family of Group VIII of the Periodic System, platinum, palladium, ruthenium, rhodium, iridium, and osmium. Two or more such metals may be used in equal or differing amounts in a catalyst. Although the fraction of the catalyst which is noble metal may vary widely, entirely suitable catalysts may comprise only in the range of about 0.1 to about 1 weight percent noble metal. The extent of purification achieved appears to be largely independent of the percentage of noble metal in the catalyst.

Various supports for the noble metal may be used, such as activated charcoal, calcined alumina having a high surface area (greater than about 25 meters per square gram, as distinct from corundum, which has a lower surface area), other refractory inorganic oxides such as silica gel, titania, ziconia, thoria, magnesia, boria and mixtures of such oxides, kieselguhr, fuller's earth, etc. Disposing the noble metal on a support having a high surface area, preferably upwards of 100 square meters per gram, is advantageous because it tends to reduce the amount of catalyst and the contacting time necessary to achieve a particular maximum level of impurity in the purified product. Activated charcoal, particularly when made from vegetable matter, and high surface area gamma- or eta-alumina are preferred supports for the noble metal.

Suitable catalysts, and the supports used in their preparation, for use in the purification process are available as items of commerce and their manufacture and use have previously been referred to in the literature; see, for instance, Kirk-Othmer's "Encyclopedia of Chemical Technology" under appropriate headings such as Catalysts, Platinum Metals and Activated Carbon; Berkman et al.'s "Catalysis" (Rheinhold Publishing Corporation, 1940), with particular reference to chapters 4, 7 and 10; The Aluminum Company of America's Technical Paper No. 10, titled "Alumina Properties" (the 1953, 1956 and 1960 editions), in respect of calcined aluminas of the gamma-type, which phrase excludes corundum, and such specific references to the use of noble metal catalysts as U.S. Patent No. 3,007,941 and Hawthorne et al. note appearing in J. Organic Chemistry, 25, pages 2215–16 (December 1960).

The catalyst may be used in the form of a fine powder, granules, or in a shaped configuration, such as pellets, with the actual selection depending largely upon the ease of operation of the process equipment used rather than upon process criteria. However, the catalyst should be readily separable from the solution in order that traces of it may not appear in the purified product.

The contacting of the hot acidic solution with the catalyst may be in a batch or continuous system. A catalyst may be simply slurried in contact with the solution, or the solution passed through a fixed bed of catalyst. Contacting time may be varied widely, from a few minutes up to an hour or more, with the actual time selected depending upon such variables as the extent of purification desired, the character of the particular catalyst used, and whether the solution is sufficiently agitated to minimize mass transfer and diffusion problems. In a continuous flow system, it is simple and preferable to exclude a gas phase.

Relatively minor amounts of catalyst are sufficient to achieve a high purity of product acid. Generally, sufficient catalyst is used to provide about 25–1000 p.p.m. of noble metal, based on the amount of acid being purified, preferably 100–500 p.p.m. Because of the wide range of the fraction of the catalyst which is noble metal, the total amount of catalyst relative to the amount of acid being purified varies in a batch system from less than 1% to more than 20%. In continuous systems using a fixed bed of catalyst, catalyst life, expressed as pounds of acid treated per pound of catalyst, may be 100 or more.

After the contacting of the solution with the catalyst, the acid is recovered. This may most easily be done, after having separated the contacted solution from the catalyst, by cooling the solution to crystallize the acid, and then separating the precipitate from the solution by conventional liquid-solids separation means, such as filtering, centrifuging or decantation. Optionally, the recovered purified acid may be washed with a suitable solvent to remove surface-adhering mother liquor from the separated crystals. The filtering may be done over a wide range of temperatures, but is preferably done in the range of 200–320° F.

Having thus described the invention, the following data are presented to illustrate various embodiments of it.

Terephthalic acid containing about 1.3–2.6% of 4-carboxybenzaldehyde made by the oxidation with oxygen of paraxylene using a heavy metal catalyst in the conjoint presence of bromine was purified according to the following procedure, except as otherwise specifically noted. The runs were conducted using a solution comprising 5.7 weight percent terephthalic acid in water. A 5-gallon stainless steel autoclave provided with electrical heating units and a cooling coil was used. Four hour batch runs were made by charging to the previously cleaned autoclave the crude terephthalic acid, water and the catalyst to be used. The autoclave was then heated to the desired temperature, generally to 475° F. about 90 minutes being required. Sufficient pressure was used to maintain a liquid phase. During the runs, the solution was agitated by a constant speed turbine mixer. At the conclusion of the runs, the autoclave and its contents were cooled to about 100° F., and the contents drained and filtered to separate the solids. The autoclave was then rinsed with fresh distilled water and any solids recovered from the rinse water added to the previously obtained solids, which were then analyzed for 4-carboxybenzaldehyde content using a polarographic method.

(1) The effectiveness of varying amounts of noble metal on the catalyst is illustrated by three runs in which 0.5, 5 and 10% palladium supported on activated charcoal was used. In each instance the run was conducted using 450 grams of terephthalic acid dissolved in 16.6 pounds of water (providing a 5.7% solution) at 475° F. for four hours. A catalyst comprising 0.5 weight percent palladium supported on 4–12 mesh activated carbon reduced the 4-carboxybenzaldehyde content from 2.58 weight percent in the crude terephthalic acid to 540 p.p.m. in the purified acid. Fifteen grams of this catalyst were used, providing 167 p.p.m. of palladium based on crude terephthalic acid feed. Recovery of terephthalic acid was 93.3%.

(2) In a second run using the same procedure but utilizing a crude terephthalic acid containing 1.35 weight percent 4-carboxybenzaldehyde, 2.14 grams of catalyst comprising 5 weight percent palladium on powdered activated carbon (equivalent to 240 p.p.m. of palladium based on crude terephthalic acid) provided a product having less than 200 p.p.m. of 4-carboxybenzaldehyde at a recovery of 76%. The TEG color was improved from 1250 in the crude product to 470 in the purified product (TEG color was determined by heating a 4 gram aliquot of terephthalic acid in triethyl glycol at 500° F. for 90 minutes, electrophotometrically measuring monochromatic light transmittance through the resultant product, and comparing the transmittance with APHA standards).

(3) In a third run, 2 grams of catalyst comprising 10 weight percent palladium on powdered activated carbon reduced the 4-carboxybenzaldehyde content of the terephthalic acid from 2.58 percent to 200 p.p.m. with a 70% recovery of terephthalic acid. The catalyst provided 450 p.p.m. of palladium based on crude terephthalic acid.

Satisfactory purification may be obtained when ruthenium or rhodium is substituted for palladium in the catalyst described above.

(4) In a fourth run, a catalyst comprising 0.5 weight percent palladium on powdered calcined gamma-type alumina reduced the 4-carboxybenzaldehyde content from 1.28 percent to less than 200 p.p.m., with a measured recovery of terephthalic acid slightly exceeding 100%. Fifteen grams of such catalyst was used, providing 167 p.p.m. of palladium based on terephthalic acid.

(5) In runs similar to the foregoing, but where no catalyst is used (crude terephthalic acid recrystallized by cooling an aqueous solution thereof down from temperatures in the range of 475–5000° F.), reduction of the 4-carboxybenzaldehyde content was found to be about 25–30%. Use of either unsupported palladium alone or merely high surface area alumina or charcoal does not give as great an improvement and purity as the use of the catalysts herein disclosed. Treatment of crude terephthalic acid with very finely divided palladium black reduced the 4-carboxybenzaldehyde content only nominally more than is obtained by simple recrystallization from hot water of terephthalic acid. When using an activated charcoal, having a surface area of about 850 square meters per gram and believed to have been obtained from pulp mill residue, but in the absence of any noble metal, the 4-carboxybenzaldehyde content of terephthalic acid was reduced from 1.28 weight percent to 0.63 weight percent. The amount of charcoal used was 1.1 percent based on crude terephthalic acid. As in the preceding runs, the contacting was done for four hours at 475° F. In a companion experiment, a commercially obtained activated alumina in the amount of 8.89% based on crude acid reduced the 4-carboxybenzaldehyde content from 1.28 percent to 0.4 percent.

(6) An analysis of impurities in the crude terephthalic acid feed, purified terephthalic acid and the residue remaining in the mother liquor after removal of purified terephthalic acid revealed that 97.7% of the 4-carboxybenzaldehyde in the crude terephthalic acid was destroyed. In conducting this experiment, 450 grams of terephthalic acid containing 2.58 weight percent 4-carboxybenzaldehyde was purified using 15 grams of a catalyst comprising 0.5 weight percent palladium supported on 4–12 mesh activated carbon. The purified acid contained 540 p.p.m. of 4-carboxybenzaldehyde. On a molar basis, the crude terephthalic acid contained 0.0781 gram mole of 4-carboxybenzaldehyde, whereas only 0.0018 gram mole was in the product acid and residue, leaving 0.0763 gram mole unaccounted for. On the other hand, the crude terephthalic acid contained 0.0011 gram mole of benzoic acid, whereas 0.0561 gram mole was found upon analysis after the experiment, resulting in an increase of 0.0550 gram mole. About 90% of the benzoic acid made as a result of the purification was found in the residue.

(7) Advantageous results may be obtained by a technique suggested by others, namely, by soaking the catalyst in an alkaline solution before using it. Two grams of a catalyst comprising 10% palladium supported on powdered activated charcoal was soaked in a solution of 5 grams of sodium hydroxide dissolved in 25 grams of water for 22 hours and thereafter dried. Four hundred fifty grams of a crude terephthalic acid, containing 1.35 weight percent of 4-carboxybenzaldehyde, dissolved in 16.6 pounds of water at 475° F. was purified by contacting with such dried catalyst to a 4-carboxybenzaldehyde content of 104 p.p.m. Acid recovery was 92.5 weight percent.

(8) In the following illustrative example a percolation method of conducting the purification is employed. In this percolation method the catalyst is 0.5% by palladium on 4–8 mesh granular carbon. The catalyst is wet screened through a 10 mesh screen (hole size of 0.62 inch). Of the wet screened catalyst 8.44 pounds are added to a tubular titanium column having an internal diameter of 4 inches. The length of the resulting catalyst bed is 44 inches. The catalyst is supported on a titanium plate screen having holes of 0.043 inch diameter on 0.078125 inch centers. An aqueous solution of impure terephthalic acid is percolated through the column. There is a solution of impure terephthalic acid entering the top of the column and the treated solution being withdrawn from the bottom of the column. The treated solution flowing from the column is, of course, collected under pressure and thereafter cooled and depressurized to crystallize therefrom dissolved terephthalic acid. The crystallized terephthalic acid is recovered by filtration and is wash and dried. The purity of the washed and dried terephthalic acid is determined.

The impure terephthalic acid has 4070 p.p.m. 4-CBA. The weight percent of dissolved solids, the temperature, pressure and space velocity of the aqueous solution of the impure terephthalic acid is shown in the accompanying table.

TABLE I

| | |
|---|---|
| 4-CBA in feed TA, p.p.p. | 4070 |
| Feed solution: | |
|   Dissolved solids, wt. percent | 8.28 |
|   Temperature, ° C. | 251 |
|   Pressure p.s.i.g. | 575 |
|   Space velocity, lb./hr./ft.$^3$ | 35.4 |
| Recovered terephthalic acid: | |
|   4-CBA, p.p.m. | 10 |
|   TEG color, APHA | 12 |
|   Optical density, 340 m$\mu$ | 0.106 |
|   Benzoic acid, p.p.m. | 52 |
|   p-Toluic acid | 180 |

(9) A ten percent (10%) aqueous solution of an impure orthophthalic acid containing one to two percent (1–2%) 2-carboxybenzaldehyde is prepared by heating the slurry with agitation to about 205° F. An amount of ten percent (10%) palladium on powdered charcoal catalyst equivalent to 230 p.p.m. palladium based orthophthalic acid is then added and two to four hours of agitated contacting provided. Filtration, to remove the catalyst, followed by cooling to 70° F. would crystallize ninety-four percent (94%) of the orthophthalic acid in which the amount of 2-carboxybenzaldehyde is significantly reduced. While the solution temperature, and therefore the reaction temperature, is lower for this system than for the terephthalic acid system, the kinetics of the reaction are limited by mass transfer for the extremely small reactant concentration involved and therefore relatively insensitive to temperature changes. The lower solution temperature negates the need for pressure equipment.

(10) A ten percent (10%) aqueous solution of an impure isophthalic acid containing 0.1–0.2% 3-carboxybenzaldehyde is prepared by heating the slurry with agitation to 385° F. An amount of ten percent (10%) palladium on powdered charcoal catalyst equivalent to 230 p.p.m. palladium based on isophthalic acid is then added and two to four hours of agitated contacting provided. Filtration, to remove the catalyst, followed by cooling to 70° F. crystallizes more than ninety-nine and one half percent (99.5%) of the isophthalic acid in which the amount of 3-carboxybenzaldehyde is significantly reduced. The operating conditions for isophthalic acid are substantially the same as those given for terephthalic acid.

(11) A ten percent (10%) aqueous solution of an impure trimellitic acid containing one to two percent (1–2%) trimellitic aldehyde is prepared by heating the slurry with agitation to 205° F. An amount of ten percent (10%) palladium on powdered charcoal catalyst equivalent to 230 p.p.m. palladium based on isophthalic acid is then added and two to four hours of agitated contacting provided. Filtration to remove the catalyst followed by cooling to 70° F. crystallizes about ninety percent (90%) of the trimellitic acid in which the amount of trimellitic aldehyde is significantly reduced. This system, like the orthophthalic acid system, is operated at atmospheric pressure.

Having thus described the invention, what is claimed is:

1. A process for purifying benzene polycarboxylic acids which comprises forming a solution of a crude benzene polycarboxylic acid containing as principal impurities aldehydobenzene carboxylic acids, contacting said solution in the liquid phase at a temperature in the range of 100 to 300° C. and in the absence of hydrogen with a supported Group VIII noble metal catalyst, and thereafter cooling said solution to precipitate purified benzene polycarboxylic acid containing less of said aldehydo carboxylic acid impurity from solution as a solid and separating the solid precipitate from the solvent.

2. The process of claim 1 wherein said catalyst comprises in the range of about 0.01 to about 10 weight percent of said noble metal.

3. The process of claim 1 wherein said noble metal is palladium.

4. The process of claim 1 wherein said support is activated charcoal.

5. The process of claim 1 wherein said support is an alumina having a high surface area.

6. The process of claim 1 wherein said crude acid is selected from the class consisting of the dicarboxylic, tricarboxylic and tetracarboxylic acids of benzene.

7. The process of claim 1 wherein the solvent for said solution is water.

8. A process for purifying crude terephthalic acid having 4-carboxybenzaldhehyde as principal impurity which comprises forming an aqueous solution of said crude terephthalic acid, contacting said solution in the liquid phase in an inert atmosphere with a catalyst comprising 0.1–10 weight percent palladium disposed on a high surface area support at an elevated temperature in the range of about 200 to 300° C. and thereafter cooling said solution whereby purified terephthalic acid containing less of said 4-carboxybenzaldehyde impurity precipitates, separating said purified terephthalic acid from said solution.

References Cited
UNITED STATES PATENTS

| | | | |
|---|---|---|---|
| 2,744,938 | 5/1956 | Urban | 260—525 |
| 3,058,997 | 10/1962 | Taylor et al. | 260—525 |
| 3,071,614 | 1/1963 | Knobloch | 260—525 |

LORRAINE A. WEINBERGER, Primary Examiner

R. S. WEISSBERG, Assistant Examiner